US009450486B2

(12) United States Patent
Tang et al.

(10) Patent No.: US 9,450,486 B2
(45) Date of Patent: Sep. 20, 2016

(54) APPARATUS AND METHOD FOR IMPLEMENTING A MULTIPLE FUNCTION PIN IN A BCM POWER SUPPLY

(71) Applicant: Richtek Technology Corporation, Zhubei (TW)

(72) Inventors: Chien-Fu Tang, Hsinchu (TW); Jiun-Hung Pan, Taipei (TW); Isaac Y. Chen, Jubei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 371 days.

(21) Appl. No.: 14/266,566

(22) Filed: Apr. 30, 2014

(65) Prior Publication Data

US 2014/0328087 A1 Nov. 6, 2014

(30) Foreign Application Priority Data

May 3, 2013 (TW) ............................ 102115895 A

(51) Int. Cl.
*H02M 3/335* (2006.01)
*H02M 3/156* (2006.01)
*H02M 1/00* (2006.01)

(52) U.S. Cl.
CPC ..... *H02M 3/156* (2013.01); *H02M 2001/0009* (2013.01)

(58) Field of Classification Search
CPC .................... H02M 3/33507; H02M 3/33523; H02M 3/335; H02M 3/33569; H02M 3/3385; H02M 3/33538; H02M 3/33515; H02M 3/33592; H02M 3/33576; H02M 3/33561; H02M 3/33546; H02M 3/156
USPC ........................................... 363/21.01–21.12
See application file for complete search history.

(56) References Cited

U.S. PATENT DOCUMENTS 7,355,375 B2 4/2008 Xi
2007/0029984 A1 2/2007 Melai et al.
2012/0105041 A1 5/2012 Lin et al.
2012/0112816 A1 5/2012 Wang et al.
2012/0306459 A1 12/2012 Ho et al.
2013/0077370 A1 3/2013 Gu et al.

FOREIGN PATENT DOCUMENTS

CN 100371844 C 2/2008
KR 100764387 B1 10/2007
KR 20080004704 A 1/2008

*Primary Examiner* — Jessica Han
*Assistant Examiner* — Kevin H Sprenger
(74) *Attorney, Agent, or Firm* — Muncy, Geissler, Olds & Lowe, P.C.

(57) ABSTRACT

An apparatus and a method for implementing a multiple function pin in a boundary conduction mode power supply, uses a same pin to switch a power switch and to achieve zero current detection to reduce pin count and save cost of a control integrated circuit. A first voltage is applied to the multiple function pin to turn on the power switch, and then a second voltage is applied to the multiple function pin after the power switch has been turned on for a first time, to thereby turn off the power switch. After the power switch has been turned off for a second time, a third voltage is applied to the multiple function pin keep the power switch off. Preferably, a tristate output driver is used to provide the first and second voltages, and a clamping circuit is used to provide the third voltage.

12 Claims, 6 Drawing Sheets

Vin L1 IL VD Vo D1 44 Vs L2 Cr Rr VZCD Vfb SW Sen 54 Vref M2 Rp 56 GD M1 42 40 50 Vcc M3 Vrefz Szcd1 52 Szcd2 46 M4 Vof Vth 58 GND GD_L 48 Control Circuit Sen GD_H 40
Vin
L1
IL
VD
D1
Vo
Vfb
M1
GD
44
L2
Cr
Rr
Vs
$V_{ZCD}$
Rp
42
SW
Sen
M2
54
56
Vref
50
Vrefz
Vof
Vth
58
Szcd1
52
Szcd2
Sen
48
Control Circuit
GD_L
GD_H
46
Vcc
M3
M4
GND Vin
L1
IL
VD
D1
Vo
Vfb
M1
40
52
Szcd2
Szcd1
Sen
48
Control Circuit
58
Vrefz
Vof
Vth
50
Chv
44
VZCD
GD
Rp
SW
Sen
M2
56
54
Vref
42
Vcc
M3
M4
GND
46
GD_L
GD_H

APPARATUS AND METHOD FOR IMPLEMENTING A MULTIPLE FUNCTION PIN IN A BCM POWER SUPPLY

FIELD OF THE INVENTION

The present invention is related to a Boundary Conduction Mode (BCM) power supply, especially to an apparatus and a method for implementing a multiple function pin in a BCM power supply.

BACKGROUND OF THE INVENTION

Conventional BCM power supplies, such as boost, flyback, and buck converters, require a single pin to achieve Zero Current Detection (ZCD) for switching a power switch. FIG. 1 shows a conventional boost BCM power supply, in which a rectifier 10 rectifies an Alternating-Current (AC) voltage Vac to generate an input voltage Vin, an inductor L1, a power switch M, and a diode D1 establish an asynchronous power stage, a control Integrated Circuit (IC) 12 has a pin 14 for controlling the power switch M1 so that the asynchronous power stage converts the input voltage Vin into an output voltage Vo, an auxiliary winding La senses the change in the across voltage of the inductor L1 and asserts a zero-current detected signal $V_{ZCD}$ when the current IL in the inductor L1 becomes zero to apply to a pin 16 of the control IC 12, and the control IC 12 identifies the timing of the inductor current IL that decreases to zero depending on the zero-current detected signal $V_{ZCD}$, and turns on the power switch M1 at the moment that the inductor current IL decreases to zero.

FIG. 2 shows a conventional quasi-resonant flyback BCM power supply, in which a rectifier 10 rectifies an AC voltage Vac to generate an input voltage Vin, a winding Lp at the primary side is connected between the rectifier 10 and a power switch M1, a winding Ls at the secondary side is connected between an output terminal Vo and a ground terminal, a control IC 20 has a pin 22 for switching the power switch M1 for converting the input voltage Vin into an output voltage Vo, an auxiliary winding La senses the current Is in the inductor Ls for asserting a zero-current detected signal $V_{ZCD}$ to apply a pin 24 of the control IC 20 for the control IC 20 to identify the timing of the inductor current Is that decreases to zero, and the control IC 20 turns on the power switch M1 at the moment that the inductor current IL decreases to zero.

FIG. 3 shows a conventional buck BCM power supply, in which a control IC 30 has a pin 32 for switching a power switch M1 to charge and discharge an inductor L for generating a stable current ILED for a LED string 36, a filter 38 composed of resistors Rf1, Rf2, and Rf3 and a capacitor Cf detects the current IL in an inductor L1 and asserts a zero-current detected signal $V_{ZCD}$ when the inductor current IL decreases to zero to apply to a pin 34 of the control IC 30, and the control IC 30 turns on the power switch M1 responsive to the zero-current detected signal $V_{ZCD}$.

As illustrated in FIGS. 1 to 3, a conventional BCM power supply needs two pins to drive the power switch M1 and detect the zero current, respectively. If a pin can both drive the power switch M1 and detect the zero current, the pin number of the control IC and the cost thereof can be reduced. U.S. Pat. No. 7,355,373 disclosed using a signal on a multiple function pin to both drive the power switch and detect the zero current. However, the disclosed control IC cannot turn on the power switch, and an external circuit of the control IC is required to turn on the power switch instead. Accordingly, users have to set parameters of the external circuit by themselves, so that the power switch can be turned on and turned off, and this brings inconvenience to the users.

SUMMARY OF THE INVENTION

An objective of the present invention is to provide an apparatus and a method for implementing a multiple function pin in a BCM power supply.

Another objective of the present invention is to provide an apparatus and a method for driving a power switch and achieving a zero current detection by using a single pin.

According to the present invention, an apparatus for implementing a multiple function pin in a BCM power supply includes a tristate output driver, a zero-current detected signal generator, a zero current detector, and a clamping circuit. The tristate output driver provides a first voltage to turn on a power switch when it starts up, and provides a second voltage to turn off the power switch after the power switch has been turned on for a first time. The tristate output driver is turned off after the power switch has been turned off for a second time. The zero-current detected signal generator detects the change in the across voltage of the inductor, and asserts a zero-current detected signal to apply to the multiple function pin when the current of the inductor becomes zero. The zero current detector detects the voltage of the multiple function pin, and asserts a zero current signal when the voltage of the multiple function pin reaches a threshold, to start up the tristate output driver. The clamping circuit provides a third voltage during the off time of the tristate output driver, to turn off the power switch.

According to the present invention, a method for implementing a multiple function pin in a BCM power supply includes steps of providing a first voltage to the multiple function pin to turn on a power switch; providing a second voltage to the multiple function pin after the power switch has been turned on for a first time so as to turn off the power switch; providing a third voltage to the multiple function pin after the power switch has been turned off for a second time so as to turn off the power switch; detecting the change in the across voltage of the inductor for asserting a zero-current detected signal to the multiple function pin when the current of the inductor becomes zero; and detecting the voltage of the multiple function pin for triggering a zero current signal when the voltage of the multiple function reaches a threshold, so that the first voltage is provided to turn on the power switch.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
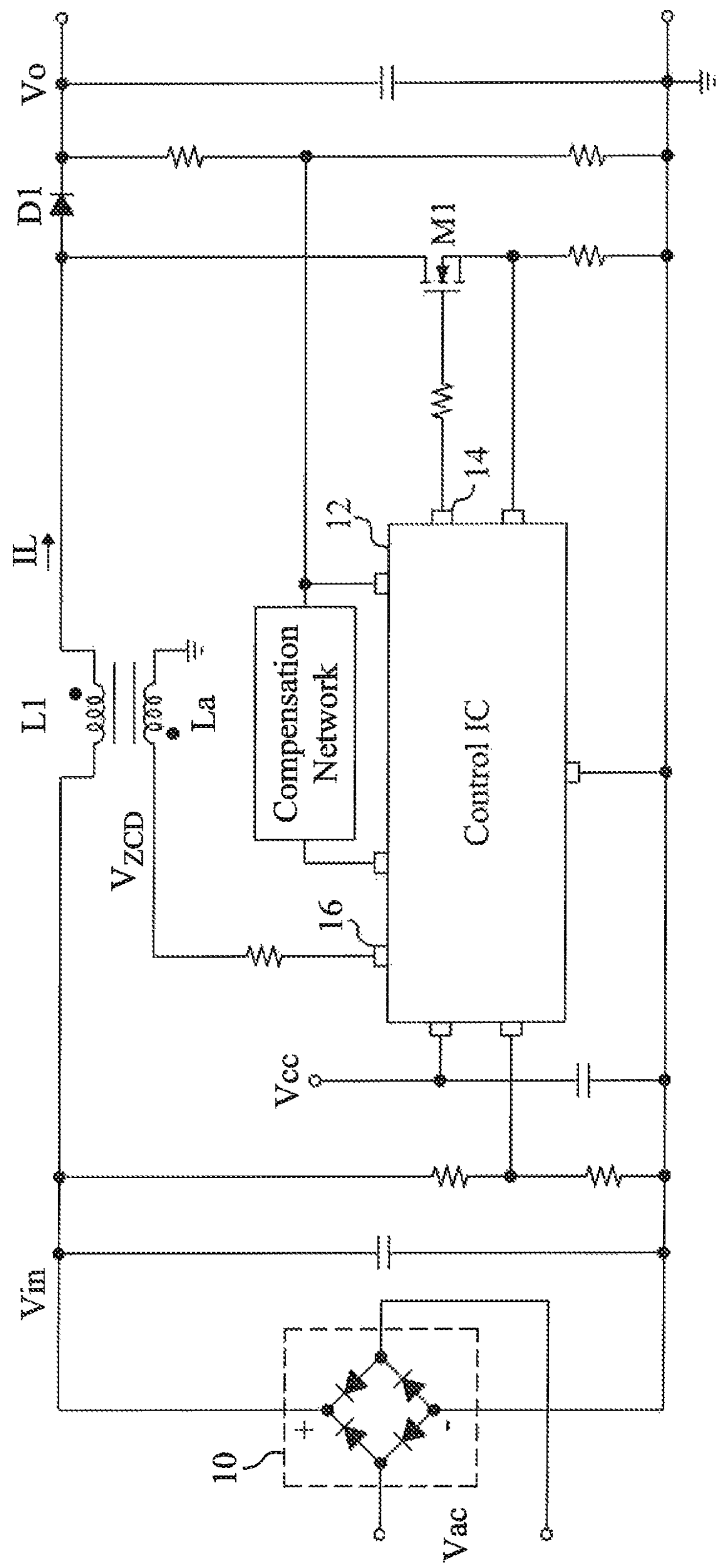
FIG. 1 shows a conventional boost BCM power supply.
Figure 2:
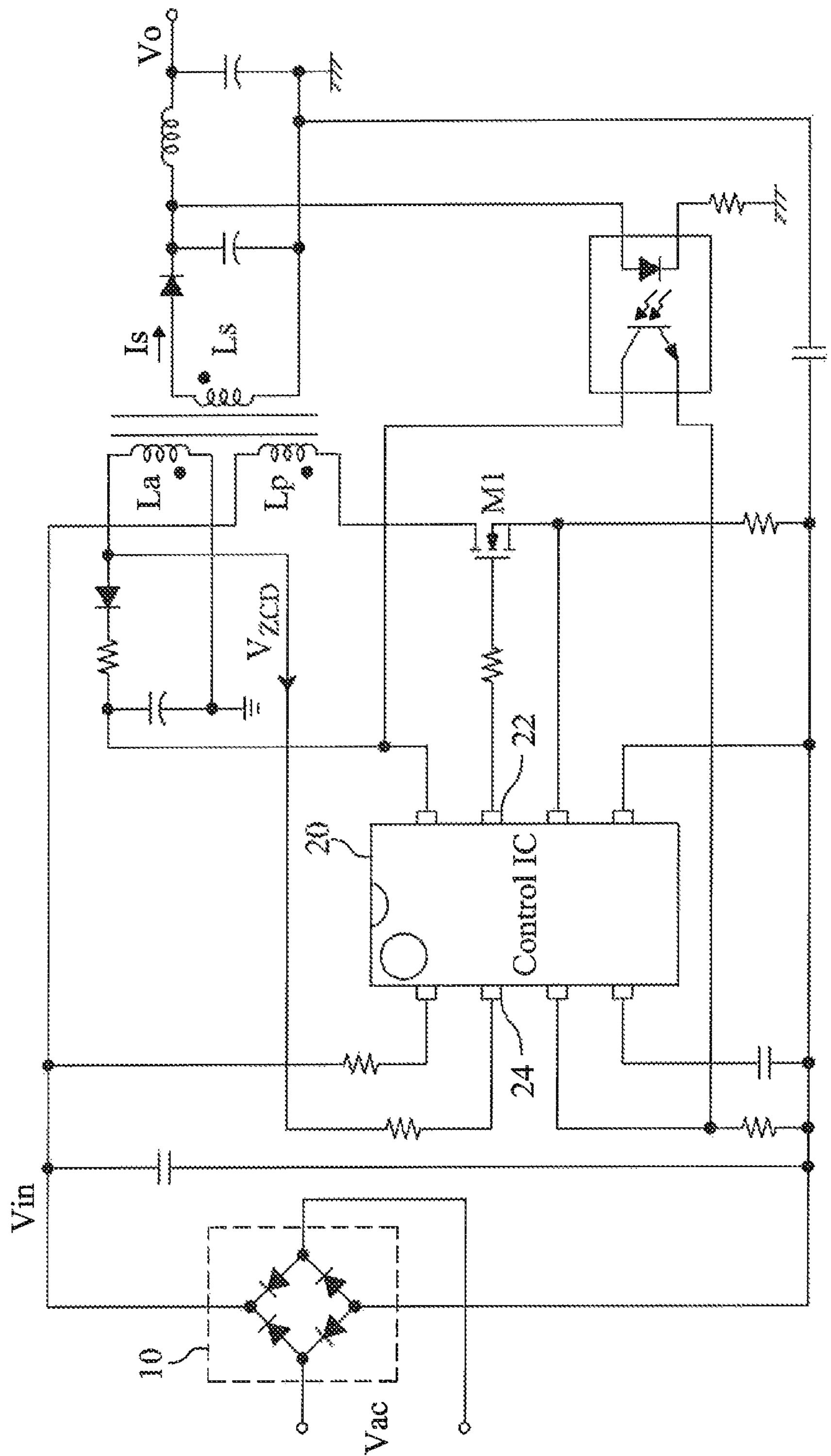
FIG. 2 shows a conventional quasi-resonant flyback BCM power supply.
Figure 3:
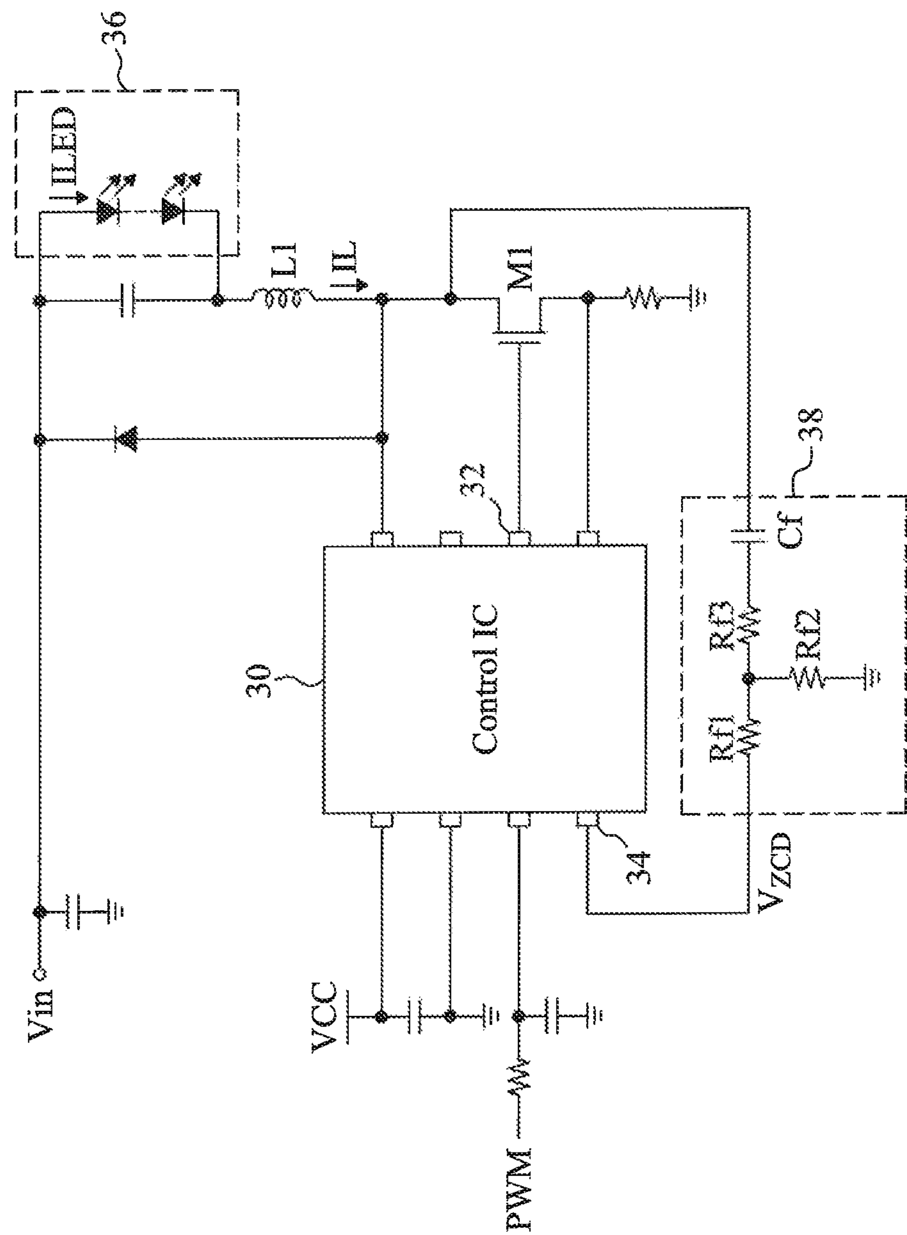
FIG. 3 shows a conventional buck BCM power supply.
Figure 4:
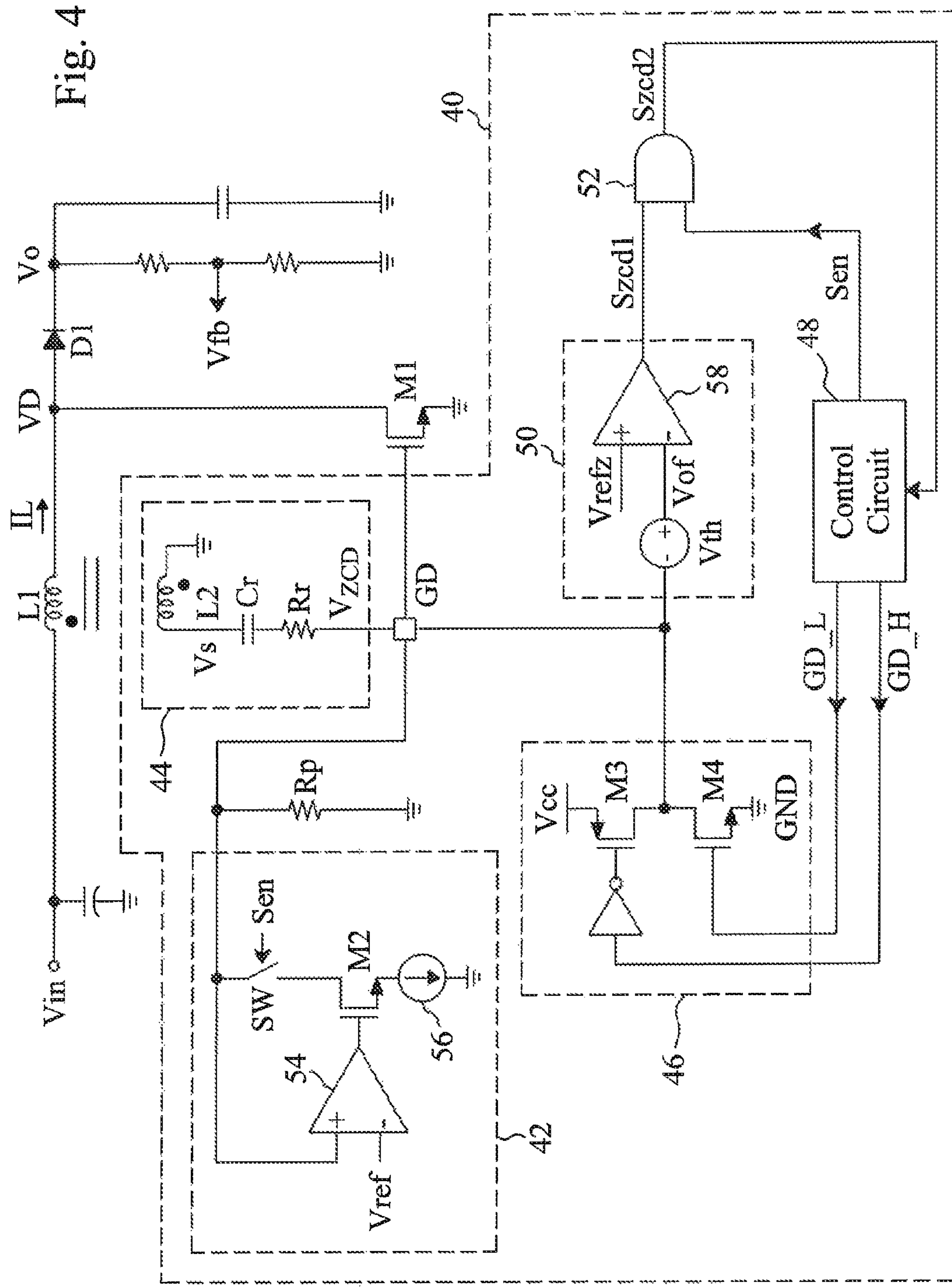
FIG. 4 is a circuit diagram of a first embodiment according to the present invention.

FIG. 4 shows a boost BCM power supply according to the present invention, in which an inductor L1, a power switch M1, and a diode D2 establish an asynchronous power stage, an apparatus 40 for implementing a multiple function pin according to the present invention utilizes a multiple function pin GD to control the power switch M1, so that the power stage can convert an input voltage Vin into an output voltage Vo, and to achieve zero current detection. The apparatus 40 for implementing a multiple function pin includes a clamping circuit 42, a preset resistor Rp, a zero-current detected signal generator 44, a tristate output driver 46, a control circuit 48, a zero current detector 50, and an AND gate 52. The clamping circuit 42 includes an operational amplifier 54, an enable switch SW, a transistor M2, and a current source 56. The operational amplifier 54 has an inverting input to receive a reference voltage Vref, and a non-inverting input connected to the multiple function pin GD. The enable switch SW, the transistor M2, and the current source 56 are connected in series between the multiple function pin GD and a ground terminal. The enable switch SW is controlled by a control signal Sen. When the enable switch SW is turned on, the clamping circuit 42 starts up. Due to virtual short between the inputs of the operational amplifier 54, the reference voltage Vref on the inverting input of the operational amplifier 54 will be applied to the multiple function pin GD. The zero-current detected signal generator 44 includes an auxiliary winding L2 for sensing the across voltage of the inductor L1 to generate a voltage Vs that is related to the inductor current IL, and a capacitor Cr and a resistor Rr connected in series between the auxiliary winding L2 and the multiple function pin GD. The capacitor Cr is used to filter out low frequency component of the voltage Vs to generate a zero-current detected signal $V_{ZCD}$, and the resistor Rr serves as a current limiting element. The tristate output driver 46 includes a switch M3 connected between a power input terminal Vcc and the multiple function pin GD, and a switch M4 connected between the multiple function pin GD and the ground terminal GND. The control circuit 48 provides control signals GD_H, GD_L and Sen to control the switches M3, M4, and SW, respectively. The zero current detector 50 includes an offset voltage source Vth for offsetting the voltage of the multiple function pin GD to generate a voltage Vof, and a comparator 58 to compare the voltage Vof with the reference voltage Vrefz. When the reference voltage Vrefz is higher than the voltage Vof, the comparator 58 asserts a zero current signal Szcd1. In order to prevent the zero current signal Szcd1 from being mistakenly triggered and resulting in an error, the AND gate 52 uses the control signal Sen to mask the unexpected zero current signal Szcd1 so as to generate a zero current signal Szcd2.

Figure 5:
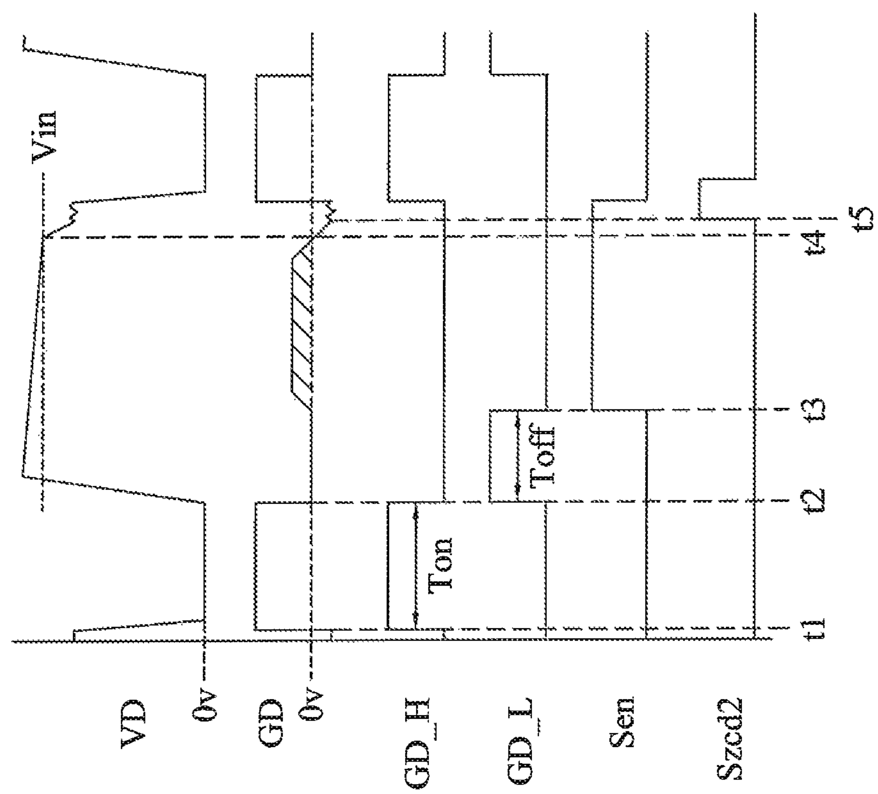
FIG. 5 is a waveform diagram of the circuit shown in FIG. 4.

FIG. 5 is a waveform diagram of the circuit shown in FIG. 4, for illustrating the operation of the apparatus 40 shown in FIG. 4. Referring to FIGS. 4 and 5, at time t1, the control circuit 48 asserts the control signal GD_H to turn on the switch M3 of the tristate output driver 46, thereby starting up the tristate output driver 46 to provide the voltage Vcc to the multiple function pin GD to turn on the power switch M1, causing the inductor current IL to increase. After the power switch M1 has been turned on for a period of time Ton, as shown at time t2, the control circuit 48 turns off the control signal GD_H and asserts the control signal GD_L to turn off the switch M4 of the tristate output driver 46, so that the tristate output driver 46 provides the voltage GND=0V to the multiple function pin GD for turning off the power switch M1, causing the inductor current IL to decrease. After the power switch M1 has been turned off for a period of time Toff, as shown at time t3, the control circuit 48 turns off the control signal GD_L and asserts the control signal Sen, so that the tristate output driver 46 turns off and can be regarded as a high impedance element. Additionally, the clamping circuit 42 is enabled and provides the multiple function pin GD with the voltage Vref to keep the power switch M1 off. At this time, the output impedance of the multiple function pin GD is determined by the preset resistor Rp. During the off time of the power switch M1, as shown from time t2 to time t4, the inductor current IL decreases, the input voltage VD of the power switch M1 gradually falls down with the decreasing inductor current IL, and the voltage Vs of the auxiliary winding L2 is a low frequency signal. Thus, the voltage Vs is blocked by the capacitor Cr and cannot be sent to the multiple function pin GD. When the inductor current IL decreases to zero, as shown at time T4, the voltage VD equals the input voltage Vin, and will present high frequency oscillation, and the voltage Vs of the auxiliary winding L2 will also present high frequency oscillation accordingly. At this time, the voltage Vs will pass through the capacitor Cr to generate the zero-current detected signal $V_{ZCD}$ applied to the multiple function pin GD. Thereby, the voltage of the multiple function pin GD is pulled down to a negative value. The voltage Vof falls down with the decreasing voltage of the multiple function pin GD. When the voltage Vof becomes lower than the reference voltage Vrefz, as shown at time t5, the comparator 58 asserts the zero current signal Szcd1, and the AND gate 52 generates the zero current signal Szcd2 according to the signals Szcd1 and Sen for the control circuit 48. Receiving the zero current signal Szcd2, the control circuit 48 turns off the control signal Sen and asserts the control signal GD_H to start up the tristate output driver 46. Accordingly, aforementioned operation is repeated.

Figure 6:
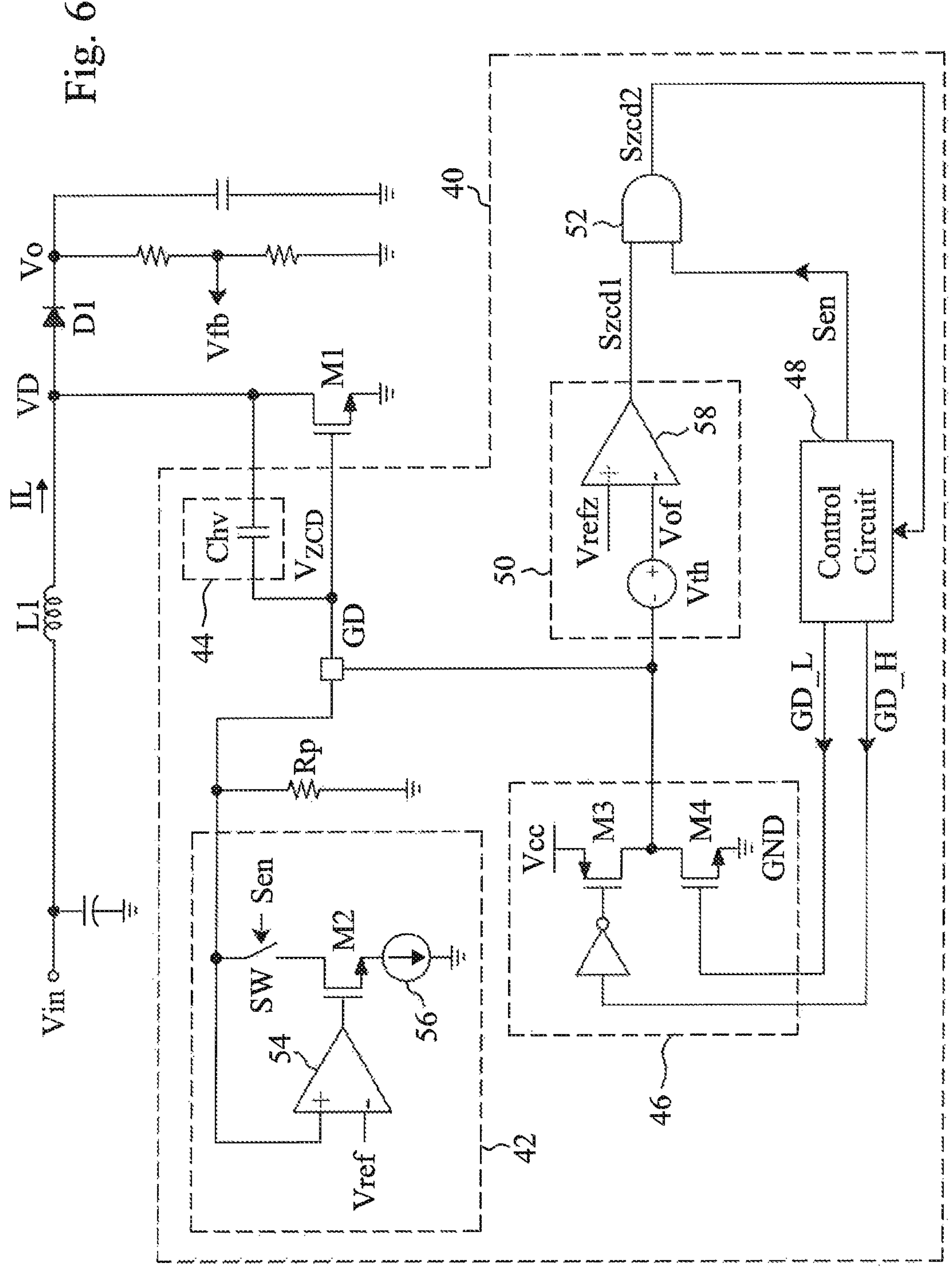
FIG. 6 is a circuit diagram of a second embodiment according to the present invention.

FIG. 6 shows a second embodiment of the apparatus 40 for implementing a multiple function pin in a BCM power supply according to the present invention. Similar to the structure shown in FIG. 4, this embodiment also includes the clamping circuit 42, the preset resistor Rp, the zero-current detected signal generator 44, the tristate output driver 46, the control circuit 48, the zero current detector 50, and the AND gate 52. However, a high-voltage capacitor Chv is set between the inductor L1 and the multiple function pin GD for being served as the zero-current detected signal generator 44. In this embodiment, the high-voltage capacitor Chv can be an externally added capacitor or a parasitic capacitor between the input terminal and the control terminal of the power switch M1. As shown by FIGS. 5 and 6, the operations of the clamping circuit 42, the tristate output driver 46, the control circuit 48, the zero current detector 50, and the AND gate 52 are similar to those in the previous embodiment. During the off time of the power switch M1, as shown from time t2 to time t4, the inductor current IL decreases, and the input voltage VD of the power switch M1 gradually decreases with the decreasing inductor current IL. At this time, the voltage VD is a low frequency signal, so that it is blocked by the capacitor Chv and unable to be sent to the multiple function pin GD. When the inductor current IL decreases to zero, as shown at time T4, the voltage VD will present high frequency oscillation, and the voltage Vs will pass through the capacitor Chv to generate the zero-current detected signal $V_{ZCD}$ applied to the multiple function pin GD. Accordingly, the voltage of the multiple function pin GD will be pulled down to a negative value.

Although the present invention is depicted with the boost BCM power supplies as embodiments, it does not limit the present invention to be applied to any types of BCM power supplies, such as the flyback and the buck converters.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for implementing a multiple function pin in a boundary conduction mode power supply including an inductor and a power switch, the apparatus comprising:

a tristate output driver connected to a control terminal of the power switch via the multiple function pin, providing a first voltage to turn on the power switch when being started up, providing a second voltage to turn off the power switch after the power switch has been turned on for a first time, and being turned off after the power switch is turned off for a second time;

a zero-current detected signal generator connected to the multiple function pin, detecting a change in an across voltage of the inductor for asserting a zero-current detected signal when a current in the inductor becomes zero, to apply to the multiple function pin;

a zero current detector connected to the multiple function pin, detecting a voltage of the multiple function pin for asserting a zero current signal when the voltage of the multiple function pin reaches a threshold, to start up the tristate output driver; and a clamping circuit connected to the multiple function pin, providing a third voltage during an off time of the tristate output driver to turn off the power switch.

2. The apparatus of claim 1, wherein the tristate output driver comprises:

a first switch having a first terminal to receive the first voltage and a second terminal connected to the multiple function pin, applying the first voltage to the multiple function pin when it is on; and a second switch having a first terminal connected to the multiple function pin and a second terminal to receive the second voltage, applying the second voltage to the multiple function pin when it is on.

3. The apparatus of claim 1, wherein the zero-current detected signal generator comprises:

an auxiliary winding sensing the across voltage of the inductor to generate a fourth voltage; and a capacitor connected between the auxiliary winding and the multiple function pin, filtering out a low frequency component of the fourth voltage to generate the zero-current detected signal.

4. The apparatus of claim 1, wherein the zero-current detected signal generator comprises a high-voltage capacitor connected between the inductor and the multiple function pin, coupling a high frequency component of the across voltage of the inductor to the multiple function pin to generate the zero-current detected signal.

5. The apparatus of claim 1, wherein the power switch has an input terminal connected to the inductor.

6. The apparatus of claim 5, wherein the zero-current detected signal generator comprises a parasitic capacitor between the input terminal and the control terminal of the power switch, coupling the high frequency component of the across voltage of the inductor to the multiple function pin generate the zero-current detected signal.

7. The apparatus of claim 1, wherein the zero current detector comprises:

an offset voltage source connected to the multiple function pin, offsetting the voltage of the multiple function pin to generate a fourth voltage; and a comparator connected to the offset voltage, asserting the zero current signal when the fourth voltage is lower than a reference voltage.

8. The apparatus of claim 1, wherein the clamping circuit comprises:

a transistor;

a current source;

an enable switch serially connected to the transistor and the current source between the multiple function pin and a ground terminal; and an operational amplifier having a non-inverting input connected to the multiple function pin, an inverting input receiving the third voltage, and an input terminal connected to a control terminal of the transistor;

wherein the third voltage is applied to the multiple function pin when the enable switch is on.

9. A method for implementing a multiple function pin in a boundary conduction mode power supply including an inductor and a power switch, the method comprising steps of:

(A) providing a first voltage to the multiple function pin to turn on the power switch;

(B) providing a second voltage to the multiple function pin after the power switch has been turned on for a first time, to thereby turn off the power switch;

(C) providing a third voltage to the multiple function pin after the power switch has been turned off for a second time, to thereby turn off the power switch;

(D) detecting a change in the across voltage of the inductor for asserting a zero-current detected signal to apply to the multiple function pin when a current of the inductor decreases to zero; and (E) detecting a voltage of the multiple function pin for asserting a zero current signal to provide the first voltage when the voltage of the multiple function pin reaches a threshold, to turn on the power switch.

10. The method of claim 9, wherein the step D comprises steps of:

sensing an across voltage of the inductor to generate a fourth voltage; and filtering out a low frequency component of the fourth voltage to generate the zero-current detected signal.

11. The method of claim 9, wherein the step D comprises a step of coupling a high frequency component of the across voltage of the inductor to the multiple function pin to generate the zero-current detected signal.

12. The method of claim 9, wherein the step E comprises steps of:

offsetting the voltage of the multiple function pin to generate a fourth voltage; and asserting the zero current signal when the fourth voltage is lower than a reference voltage.

* * * * *